United States Patent [19]

Bockrath et al.

[11] Patent Number: 4,861,855

[45] Date of Patent: Aug. 29, 1989

[54] POLYAMIDE-IMIDE COMPOSITIONS FROM BISPHENOXYPHENYL DIAMINE TRICARBOXYLIC ANHYDRIDE AND TETRACARBOXYLIC DIANHYDRIDE

[75] Inventors: Ronald E. Bockrath, Oswego; Bill W. Cole, Naperville, both of Ill.

[73] Assignee: Amoco Corporation, Chicago, Ill.

[21] Appl. No.: 32,740

[22] Filed: Mar. 31, 1987

[51] Int. Cl.$^4$ ............................................. C08G 73/10
[52] U.S. Cl. .................................... 528/125; 528/185; 525/436; 524/600
[58] Field of Search ................ 528/125, 185; 525/436; 524/600

[56] References Cited

U.S. PATENT DOCUMENTS

| | | | |
|---|---|---|---|
| 3,895,064 | 6/1975 | Brode et al. | 564/315 |
| 3,914,504 | 10/1975 | Weddy | 428/367 |
| 4,017,459 | 4/1977 | Onder | 528/168 |
| 4,111,906 | 9/1978 | Jones et al. | 528/229 |
| 4,167,620 | 9/1979 | Chen | 528/481 |
| 4,196,144 | 4/1980 | Darms | 528/185 |
| 4,203,922 | 5/1980 | Jones et al. | 564/315 |
| 4,340,697 | 7/1982 | Aya et al. | 525/420 |
| 4,485,140 | 11/1984 | Gannett et al. | 428/260 |
| 4,535,101 | 8/1985 | Lee et al. | 521/189 |
| 4,576,857 | 3/1986 | Gannett et al. | 428/260 |
| 4,599,383 | 7/1986 | Satoji | 525/180 |
| 4,681,928 | 1/1987 | Berger et al. | 528/185 |
| 4,722,992 | 2/1988 | Hanson | 528/185 |
| 4,728,697 | 3/1988 | Bolon et al. | 528/185 |
| 4,755,585 | 1/1988 | Hanson et al. | 528/185 |

FOREIGN PATENT DOCUMENTS

| | | |
|---|---|---|
| 0017422 | 10/1980 | European Pat. Off. . |
| 0163518 | 12/1985 | European Pat. Off. . |
| 0175484 | 3/1986 | European Pat. Off. . |
| 2315607 | 10/1974 | Fed. Rep. of Germany . |

*Primary Examiner*—John Kight
*Assistant Examiner*—Frederick Krass
*Attorney, Agent, or Firm*—Stephen L. Hensley; William H. Magidson; Ralph C. Medhurst

[57] ABSTRACT

Polyamide-imide compositions, including amic acid precursors thereto, having in their molecules recurring units based on aromatic tri- and tetracarbonyl moieties joined by a bisphenoxyphenyl structure exhibit a desirable combination of chemical, mechanical and thermal properties and retention of these properties on exposure to elevated temperatures even after saturation with water.

35 Claims, No Drawings

POLYAMIDE-IMIDE COMPOSITIONS FROM BISPHENOXYPHENYL DIAMINE TRICARBOXYLIC ANHYDRIDE AND TETRACARBOXYLIC DIANHYDRIDE

This invention relates to polyamide-imide compositions, including polyamide-amic acid and polyamide-imideamic acid precursors thereto. More particularly, this invention relates to polyamide-imide compositions that exhibit improved water absorption properties and retention of properties on exposure to high temperatures.

BACKGROUND OF THE INVENTION

Polyamide-imides are condensation polymers finding use in a wide range of applications such as adhesives, molding compositions, fibers, films, composites, laminates, etc., owing to a desirable combination of properties. Torlon® polyamide-imides, available from Amoco Performance Products, Inc., are examples of commercial polyamide-imides.

Despite the many desirable properties of polyamideimides, their utility in certain applications has been limited by a tendency to absorb water, leading to loss of mechanical properties on exposure to high temperatures. So-called annealing or post-curing treatments of polyamide-imide or polyamide-amic acid fabricated parts, as disclosed in commonly assigned U.S. Pat. No. 4,167,620, in which water liberated due to imidization and chain extension reactions as well as absorbed moisture are allowed to diffuse out of fabricated parts with controlled heating, improve retention of mechanical properties. However, such treatments are time-consuming and do not give sufficient improvement of currently available, commercial polyamideimides for certain demanding applications. It also is known to add certain metal oxides to polyamide-imides to tie up absorbed moisture as well as water liberated during imidization and chain extension reactions to avoid cracking and sacrifices in physical properties. Again, however, this approach does not yield sufficient improvement of conventional materials for demanding applications.

Aromatic polyimides typically do not absorb water to as great an extent as polyamide-imides. This may be due to the lower levels of amide bonds in polyimides and the greater affinity of water to amide bonds than imide bonds Of course, it also is well known that utility of aromatic polyimides is limited because of their lack of solubility. Further, their high glass transition temperatures ("Tg") make melt processing impractical or impossible.

U.S. Pat. No. 4,017,459, assigned to the Upjohn Company, discloses amide-imide polymers and copolymers prepared from 2,2-bis(4-(p-aminophenoxy)phenyl)propane and trimellitic anhydride halide or from 2,2-bis(4-(p-isocyanatophenoxy)phenyl)propane and trimellitic acid or anhydride. According to the patent, such polyamide-imides are melt processable, such as by injection molding, and useful in manufacture of articles such as gears, ratchets, clutch linings, bearings, pistons and cams and electrical components. In contrast, the patentee teaches that polyamides prepared from the above-named diamine and isophthalic acid and polyimides prepared from that diamine and pyromellitic acid dianhydride or benzophenone tetracarboxylic acid dianhydride are intractable in the sense of lacking sufficient solubility for solution processing, lacking in melt processibility or lacking both.

U.S Pat. No. 4,111,906 and 4,203,922, both assigned to TRW, Inc., disclose that processibility of polyimides can be improved by using the same in predominately polyamide-amic acid form and imidizing during a final fabrication step but that such an approach is disadvantageous because voids in the final products result from water liberated due to the imidization reaction. These patents also state that chemical and thermal stability are improved by preparing polyimides from 2,2-bis(4-(p-aminophenoxy)phenyl)hexafluoropropane. According to the '906 patent, polyimides prepared from this diamine and a dianhydride are useful as coatings, adhesives and as a matrix for laminated glass or graphite structures. Polyimide foams prepared from pyromellitic acid dianhyride or other aromatic tetracarboxylic acid dianhydrides and such diamine in combination with a second aromatic diamine are disclosed in U.S. Pat. No. 4,535,101, assigned to Imi-Tech Corporation. Preparation of polyamides from the above-named diamine and diacids also is disclosed in the '906 patent. The abstracts of both the '906 and '922 patents mention polyamide-imides; however, no additional information is provided.

U.S. Pat. No. 4,340,697, assigned to Toray Industries, Inc., discloses melt processing difficulties with polyamideimides and purports to remedy the same by blending with polyphenylene sulfide, polyamide, aromatic polyester, polyphenylene ether or a phenoxy resin. According to this patent, polyamide-imides may contain, in addition to a repeating, main structural amide-imide unit, up to 50 mole percent amide or imide units, the latter being introduced into the polymer by replacing aromatic tricarboxylic acid component used in preparation with pyromellitic acid dianhydride or benzophenone tetracarboxylic acid dianhydride. A bis 4-(m-phenoxyphenyl)sulfone structure also is depicted among the multitude of chemical formulas illustrated in this patent. In contrast, the only polyamideimides employed in the examples are identified as Torlon® polyamide-imides manufactured by Amoco.

U.S. 4,485,140 and 4,576,857, both assigned to E. I. DuPont de Nemours and Company, disclose melt fusible, though not necessarily melt processible, polyimides useful as binders for advanced composite materials. These polyimides are prepared from pyromellitic acid dianhydride or a diester thereof, optionally in combination with minor amounts of another tetracarboxylic acid compound, and various diamines, including bis-(aminophenoxyphenyl)propanes or 2,2-bis(3,5-dichloro-4-(4-aminophenoxyphenyl)propane. Use of an excess of one of the components, preferably the diamine, to limit molecular weight build-up and capping of reactive species with monofunctional reagents, such as phthalic anhydride or phthalic acid or aniline, to enhance stability of melt viscosity also are disclosed. Low-void or void-free composites containing graphite, glass, aramid or other high strength fibers impregnated with such polyimides and preparation thereof by impregnating a fibrous substrate with a solution of polyimide precursors, partially removing solvent and forming the result at elevated temperature as either a single layer or multiple layers also are disclosed.

U.S. Pat. No. 4,599,383, assigned to NTN-Rulon Industries Co., Ltd., discloses compositions having improved water absorption properties containing a polyamide-imide resin in combination with a polyetherimide and a fluoro resin component.

Published European Patent Application No. 86303748.9 (Publication No. 0 163 518), filed in the name of M & T Chemicals, Inc., discloses polyimides, polyamide acids, polyamide-imides, polyesterimides and polyesteramides containing at least 10 mole percent of a reaction product of an aromatic or aliphatic mono- or dianhydride and certain aromatic diamines having an unsubstituted or halogen- or hydrocarbyl-substituted, para-phenylene radical linked by like or different alkylene, alkenylene, sulfide or oxy groups to two unsubstituted or halogen- or hydrocarbyl-substituted, monovalent, aminophenyl radicals provided that the linking groups are not contemporaneously both sulfide or oxy. Such products are said to exhibit improved processing characteristics and thermal stability and to have utility in widespread applications. Two polyamide-imides and films thereof are demonstrated in the examples. Numerous anhydrides, dianhydrides and diamines are named in this publication and mixtures of anhydrides and dianhydrides are mentioned. It is also reported that mixtures of the above-described diamines with other diamines may be used. Interestingly, such other diamines are said to include 2,2-bis(4-(p-aminophenoxy)phenyl)propane and -sulfone, although the publication also mentions, with supporting citations, that polyimides prepared from such diamines and dianhydrides are insoluble and that polyamide-imides prepared from such diamines are of uncertain solubility and processability.

While the patents and publication discussed above disclose various polyamide-imides and polyimides, the improved polyamide-imide compositions and composites according to the present invention are neither disclosed nor suggested. Further, from the teachings of such patents and publication, it could not have been predicted that the invented compositions would exhibit the processibility, reduced water absorption and other desirable properties achieved according to this invention.

It is an object of this invention to provide improved polyamide-imide compositions, including amic acid precursors thereto, and filled molding compounds, polymer blends and composites based thereon. A further object of the invention is to provide for preparation of such compositions and use thereof in manufacture of fabricated articles. A further object is to provide improved polyamide-imide compositions well suited for use in composite structures. Other objects of the invention will be apparent to those skilled in the art from the following.

We have now found that the objects of this invention can be attained by providing polyamide-imide compositions, including polyamide-amic acid and polyamide-imide-amic acid precursors thereto, comprising recurring amide-imide or amide-amic acid units and recurring imide-imide, imide-amic acid or amic acid-amic acid units containing a substituted or unsubstituted bis-(phenoxyphenyl) group in which the phenoxyphenyl groups are joined directly or by stable, non-hydroscopic linkages. Such compositions contain an excess of imide or imidizable amide linkages relative to more conventional polyamide-imides. However, imide or imidizable units are not present in sufficient excess to render the invented compositions intractable; accordingly, solution and melt processibility are sufficiently great that composite prepregs can readily be prepared by solution-impregnation of fibrous substrates and single or multi-layered, shaped composites can be formed by application of heat and pressure. Melt processibility is such that filled or unfilled compositions according to the invention can be injection molded or otherwise formed into useful articles.

DESCRIPTION OF THE INVENTION

Briefly, this invention provides polyamide-imide compositions, including amic acid precursors thereto, comprising recurring units corresponding to the formula

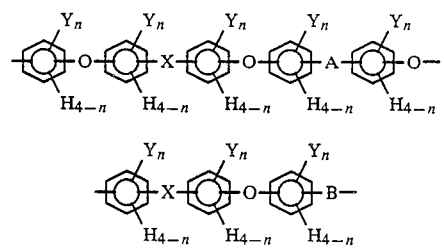

wherein each of the A and B moieties is independently

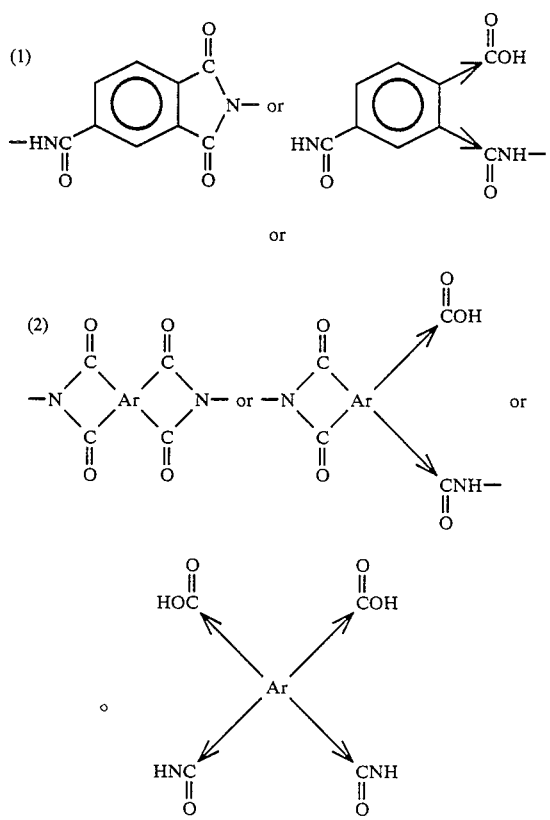

with → denoting isomerism and Ar being a tetravalent aromatic radical having each valence ortho to one other valence; each Y is independently halogen or $C_{1-6}$ alkyl; each n is independently an integer of 0 to 4, inclusive; and each X is independently a stable linkage free of sulfone and amide groups, the A and B moieties of such units providing from about 5 to about 95 mole % (1) and about 95 to about 5 mole % (2) based on total moles of (1) and (2).

Such polyamide-imides are prepared by a process comprising reacting, in a nitrogen-containing solvent, components comprising trimellitic acid component, aromatic tetracarboxylic acid component in which each carboxyl group is ortho to one other carboxyl group and aromatic diamine component corresponding to the formula

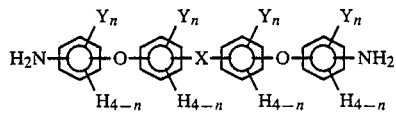

wherein X, Y and n are as described above, the trimellitic acid component and aromatic tetracarboxylic acid component containing about 5 to about 95 mole % trimellitic acid component and about 95 to about 5 mole % aromatic tetracarboxylic acid component.

Also provided according to the invention are filled compositions, polymer blends and composites comprising such polymeric compositions.

DETAILED DESCRIPTION OF THE INVENTION

In greater detail, compositions according to the invention are hydroscopically and thermally stable polymeric compositions having excellent mechanical, thermal and chemical properties and suitable for processing by melt or solution processes. As such, they are particularly suited for use in composite structures for demanding applications, such as aerospace and aircraft structures, but also useful as filled or unfilled molding compositions from which high strength articles of manufacture, e.g., automobile engine parts, turbines, brackets and aircraft components can be molded, as well as high strength binders, adhesives and coatings for various materials or substrates.

Referring to the formulas and the description thereof appearing hereinabove, it can be seen that compositions according to this invention comprise an aromatic recurring unit in which the combination of imide and imidizable amide linkages exceeds other amide linkages. By "imidizable amide linkages" is meant those amide linkages ortho to a carboxylic acid group as illustrated in the second structure represented in (1) above and the second and third structures represented in (2) above. Typically, during melt processing, annealing or curing treatments or other suitable heating, substantial conversion of such imidizable amide linkages to imide form occurs due to reaction of the ortho-disposed amide and carboxyl groups, such conversion resulting in an excess of imide bonds relative to amide bonds. It may be speculated that the improved hydroscopic properties of these polyamide-imides relative to conventional polyamide-imides, in which essentially equimolar levels of amide and imide linkages are present, are attributable, at least in part, to the reduced level of amide linkages together with the reduced level of total amide and imide linkages for a given molecular weight.

Referring again to the formula, it can be seen that the compositions according to this invention comprise a recurring, substituted or unsubstituted bis(phenoxyphenyl) moiety in which the phenoxyphenyl groups are linked by a stable linkage free of sulfone or amide groups, such moieties being joined by aromatic amide-imide or amide-amide linkages (1) or aromatic imide-imide, imide-amide, or amide-amide linkages (2) provided by moieties A and B. It is to be understood that in any given recurring unit corresponding to the formula, moieties A and B can be the same or different, i.e., each of moieties A and B is independently an aromatic amide-imide or amide-amic acid structure as shown in (1) or an imide-imide, imide-amic acid or amic acid-amic acid structure as shown in (2). Further, referring to the structures shown in (1), it is to be understood that the same can be joined to the terminal phenyl group of the bis(phenoxyphenyl) moiety through either of the nitrogen atoms. Thus, for example, in a recurring unit corresponding to the formula in which each of A and B is the first structure shown for (1), the sequence of amide and imide bonds can be any of amide-imide-imide-amide, amide-imide-amide-imide, imide-amide-amide-imide or imide-amide-imide-amide.

In structure (2), Ar represents a tetravalent aromatic radical in which each valence is ortho to one other valence. That is, the tetravalent aromatic radical has two pairs of ortho-disposed valences. Ar can comprise a single aromatic ring or two or more such rings fused or joined by one or more stable linkages such as a covalent carbon-carbon bond, oxy, sulfonyl, carbonyl, alkylene, or others. The aromatic rings can be unsubstituted or substituted, for example, with one or more halide or lower alkyl groups. Specific examples of Ar include the following:

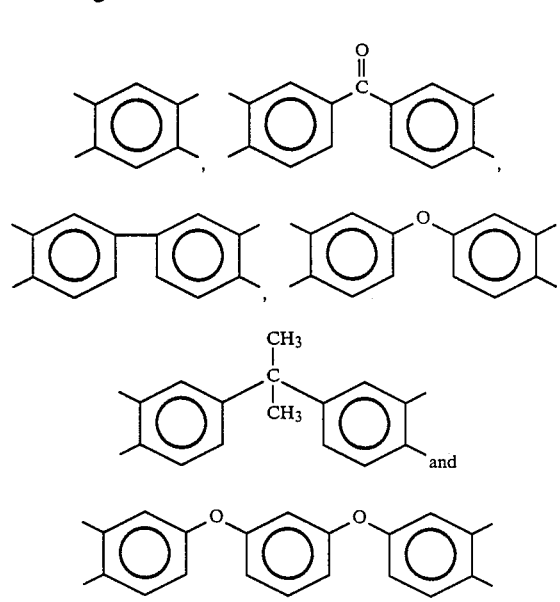

Preferably, when present, the linkage or linkages are free of amide and sulfone groups in order to minimize water absorption tendencies. More preferably, the linkage is a carbon-carbon covalent bond, oxy, carbonyl or alkylene of up to about six carbons. Best results have been attained with polyamide-imides in which Ar is the first of the structures shown above, i.e., a 1,2,4,5-phenylene group.

While each of the moieties A and B corresponds independently to one of the structures shown for (1) and (2), such that A and B may be the same or different in any given unit represented by the formula provided hereinabove, the mole percentages of (1) and (2) in the total A and B moieties of the compositions according to this invention are about 5 to about 95 and about 95 to about 5, respectively. Accordingly, it will be appreciated that some of the A or B moieties within the overall composition must correspond to one or both of the structures for (1) while other of the A or B moieties must correspond to one or more of the structures for (2).

The content of units (1) and (2) impacts both processibility and hydroscopic properties such that tailoring of compositions to requirements for specific end uses can be accomplished. As imide or imidizable amide content increases, i.e., as the mole percent of (2) based on total content of (1) and (2) increases, hydroscopic properties improve although Tg also increases such that melt processing is more difficult. Conversely, at lower mole percentages of (2), processibility is easier due to lower Tg but hydroscopic properties may fall off somewhat. A suitable balance of properties results when about 20 to about 90 mole % (1) and about 80 to about 10 mole % (2), based on total moles of (1) and (2), are present. For production of high strength composites with low water absorption tendencies, content of (1) preferably ranges from about 30 to about 80 mole % and content of (2) preferably ranges from about 70 to about 20 mole %, based on total moles of (1) and (2). For fabrication of parts by injection molding, preferred compositions according to the invention contain about 40 to about 90 mole % (1) and about 10 to about 60 mole % (2) based on total moles of (1) and (2).

Referring again to the formula representing the recurring units of the invented compositions, the aromatic rings of the bis(phenoxyphenyl) moieties can be substituted or unsubstituted. Thus, Y in the formula can be halogen, e.g,. chlorine or fluorine, or alkyl of up to about six carbons, with n being an integer of 0 to 4 inclusive. Best results have been achieved with unsubstituted compositions, that is, when n is zero.

As noted above, each X in the formula is independently a stable linkage free of sulfone and amide groups Suitably, X is oxy, carbonyl, a covalent carbon-carbon bond or unsubstituted or substituted alkylene or alkylidene of one to about twelve carbon atoms such as methylene, isopropylidene, hexafluoroisopropylidene, tetramethylene, trimethylhexamethylene and dodecamethylene. Best results have been achieved when X is isopropylidene.

Each X is independently disposed ortho, meta or para with respect to a phenoxy group within the repeating unit structure. Similarly, each of the oxy groups of the phenoxyphenyl groups is independently disposed ortho, meta or para to an A or B moiety. From the standpoint of availability of materials for preparation of the invented compositions, it is preferred that each X be disposed meta or para to its associated phenoxy groups and that the oxy groups be meta or para to A and B, best results being attained when all such groups are para-disposed.

Also provided according to the invention are a process for production of polyamide-imide compositions, including polyamide-amic acid and polyamide-imide-amic acid precursors thereto, and such polyamide-imide compositions prepared by a process, comprising reacting, in a nitrogen-containing solvent, components comprising trimellitic acid component, aromatic tetracarboxylic acid component in which each of the carboxyl groups is ortho to one other carboxyl group and aromatic diamine component corresponding to the formula

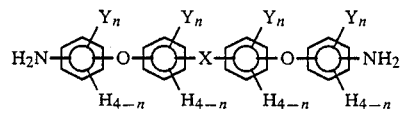

wherein X, Y and n are as described hereinabove, the amounts of trimellitic acid component and aromatic tetracarboxylic acid component ranging from about 5 to about 95 mole % and about 95 to about 5 mole %, respectively based on total moles of such components.

Suitably, the trimellitic acid component comprises trimellitic acid, trimellitic anhydride or its dimer, a trimellitoyl anhydride halide or a combination thereof. Preferably, a combination of 4-trimellitoyl anhydride chloride with trimellitic anhydride is employed because their different reactivities with diamines permit balancing of the proportions of the anhydride and acid chloride relative to each other and to the aromatic tetracarboxylic acid component in such a manner that a high degree of control over polymer inherent viscosities and, accordingly, processibility can be achieved. Thus, even in polyamideimides according to the invention in which high levels of aromatic tetracarboxylic acid component-derived units such as those corresponding to (2) in the formula presented hereinabove are present, inherent viscosities well suited for further processing can be achieved through the use of higher levels of trimellitic anhydride in the trimellitic acid component. Preferably, when using a combination of 4-trimellitoyl anhydride chloride and trimellitic anhydride, the proportion of anhydride ranges from about 2 to about 30 mole % based on total moles of trimellitic acid component and aromatic tetracarboxylic acid component. As aromatic tetracarboxylic acid component content increases relative to trimellitic acid component content, the proportion of trimellitic anhydride in the combination is preferably increased.

The aromatic tetracarboxylic acid component has each carboxyl group ortho-disposed with respect to one other carboxyl group and contains one aromatic ring or two or more such rings fused or joine by a stable linkage such as carbonyl, sulfonyl, oxy, alkylene or a covalent carbon-carbon bond. Specific examples include pyromellitic acid dianhydride, benzophenone tetracarboxylic acid dianhydride, biphenyltetracarboxylic acid dianhydride, oxybisphthalic acid dianhydride, sulfonyl-bis-phthalic acid dianhydride and isopropylidenebis-phthalic acid dianhydride. Mixtures can be employed if desired. Preferably, aromatic tetracarboxylic acid component having two or more aromatic rings have such rings linked by a sulfone and amide group-free linkage such as oxy, alkylene, a covalent carbon-carbon bond or carbonyl. More preferably, the aromatic tetracarboxylic acid component is a dianhydride, best results having been attained with pyromellitic acid dianhydride.

Suitable diamines corresponding to the above formula include 2,2-bis(4-(p-aminophenoxy)phenyl)propane, 2,2-bis(3,5-dichloro-4-(p-aminophenoxy)phenyl)propane, 2,2-bis(4-(p-aminophenoxy)phenyl)hexafluoropropane, 2,2-bis(4-(m-(aminophenoxy)phenyl)propane, 2,2-bis(4aminophenoxybiphenyl), 2,2-bis(4-p-aminophenoxy)phenyl)ether, 2,2-bis(4-m-aminophenoxy)benzophenone and combinations thereof. In the formula, X can be ortho, meta or para to each of the phenoxy groups as can the oxy groups relative to the amino groups. As indicated above, meta and para isomers are preferred due to their greater availability. Most preferably, the diamine component comprises 2,2-bis(4-(p-aminophenoxy)phenyl)propane.

As discussed above, the molar ratio of imide plus imidizable to amide linkages in the compositions according to this invention is important from the standpoint of product properties. To achieve the desired final product molar ratios, about 5 to about 95 mole % trimellitic acid component and about 95 to about 5 mole % aromatic tetracarboxylic acid component, based on the total trimellitic acid and tetracarboxylic acid components, are used. Preferably these mole percentages are about 20 to about 90 and about 80 to about 10, respectively. More preferably, mole percentages of these components are selected based on intended polymer application as discussed previously.

Preferably, essentially equimolar quantities of diamine and acids or their derivatives, e.g., anhydrides, anhydride halides, esters, are employed in preparation of the invented compositions although an excess of either can be employed and may be useful from the standpoint of controlling product properties such as inherent viscosity. It is contemplated to employ in preparation of the polyamide-imide compositions according to this invention minor amounts of acid or diamine components in addition to those described hereinabove to obtain polymeric compositions comprising recurring units as illustrated hereinabove together with minor amounts of other units. Examples of other acid components that can be employed include aliphatic and aromatic diacids such as adipic acid, isophthalic acid, terephthalic acid, 2,6-naphthalene dicarboxylic acid and its esters, phthalic anhydride and the like. Other suitable diamines include oxy(bis-aniline), meta-phenylenediamine, sulfonyl(bis-aniline), bis-aminophenoxybenzenes, bis-(aminophenoxy)phenyl sulfones, meta-toluenediamine, hexamethylene diamine, trimethylhexamethylene diamines, 1,12-diaminododecane and diamines of the type conventionally used in preparation of polyamide-imides or polyamides. Combinations of such other acid and diamine components also may be used.

If desired, effective amounts, e.g., up to about 10 mole % based on total acid component content, of capping agents such as aniline, phthalic acid or anhydride and other monofunctional reagents also can be employed in preparation to control polyamide-imide molecular weights. Advantageously, however, use of such agents is not required, particularly when the trimellitic acid component comprises a combination of trimellitic anhydride and an acyl halide thereof as described hereinabove. Trifunctional or higher polyfunctional reagents also can be employed to promote branching. Examples of such reagents are trimellitic trichloride and 1,3,5-benzenetricarboxylic acid trichloride.

Usually, reaction of the above-described components is carried out in the presence of a nitrogen-containing, organic, polar solvent such as N-methylpyrrolidone, N,N-dimethylformamide, N,N-diamethylacetamide or combinations thereof. Reaction should be carried under substantially anhydrous conditions and at a temperature below about 150° C. Most advantageously, the reaction is carried out at about 20° C. to about 70° C.

The reaction time is not critical and depends primarily on the reaction temperature. It can vary from about 1 to about 24 hours, with about 2 to about 4 hours at temperatures of about 30° C. to about 70° C. being preferred when using nitrogen-containing solvents.

As a result of the reaction there is obtained a relatively viscous solution comprising polyamide-imide, typically in predominantly amic acid form, in the reaction solvent. The invented compositions can be recovered from the solution by any suitable means, for example by precipitation with water, and then processed in powder form, pelletized for further processing or redissolved in a nitrogen-containing, organic, polar solvent for use in solution processing.

Reaction of components comprising trimellitic acid component, aromatic tetracarboxylic acid component and diamine component according to this invention also can be conducted stepwise by reacting all or part of one of the acid components with diamine component to form an oligomeric product and subsequently reacting that product with the other acid component and any remaining acid component in one or more additional steps. Preferably a stoichiometric excess of diamine component is used in relation to the acid component in the first step so that the oligomeric species resulting from the reaction are predominately amine-terminated and thus capable of further reaction with additional acid component. The first step preferably is conducted in a nitrogen-containing solvent such as identified above at temperatures and for a time sufficient to attain essentially complete reaction of the first acid component with the diamine. More preferably temperatures of about 20° C. to about 60° C. are employed during the reaction. The products of such a step can then be employed in reaction with the remaining acid component substantially as described hereinabove. When using an excess of one of the acid components relative to the other, best results are achieved when the acid component being used in lower proportion is reacted with diamine in a first step and the product thereof is reacted with the acid component being used in higher proportion in a subsequent step.

Preparation of the invented compositions according to this aspect of the invention allows for substantial flexibility in terms of polymer composition in that longer or shorter oligomeric species can be formed, depending on first step component proportions, and incorporated into the final polymer, thereby affording a high degree of control over polymer properties such as Tg. In addition, preparation by this technique yields products with the same end groups that are present in conventional polyamide-imides; accordingly curing or annealing can be conducted to enhance polymer properties.

Typically, preparation of the invented compositions in either a single or multiple step process yields products having a substantial amic acid content, e.g., in which there is present a substantial content of structures corresponding to the second structure illustrated in (1) above and the second and third structures represented in (2) above. Generally, amic acid content is about 50 to about 100 mole percent based on imidizable groups. Acid Titre is a convenient indicator of amic acid content, with values of about 1 to about 3 milliequivalents COOH per gram of polymer indicating a product of significant amic acid content. Conversion of amic acid groups to imide groups can be accomplished by heating, including that conducted during further processing, or chemical means to increase imide content as desired. Conveniently, heating at about 80° C. to about 250° C. is conducted for about 1 to about 20 hours to increase imide content as desired.

Compositions according to this invention also include those comprising the above-described polyamide-imides, including amic acid precursors thereto, blended, composited or filled with other materials such as additives, fillers, reinforcing materials, other polymeric resins and combinations thereof.

Blending with other high performance polymeric products, such as polyarylether sulfones, polyetherimides, polyphenylene oxide and other polyarylethers, polyamides, other polyamide-imides, certain polyimides and polyarylene sulfides or combinations thereof can be performed to tailor products to requirements for specific applications. Both miscible and immiscible blends are contemplated as is the use of compatibilizing agents to enhance miscibility of otherwise immiscible materials. Typically, immiscible blends contain polyamide-imide component according to the invention as a dominant polymeric resin component if it is desired that properties attributable to such component dominate blend properties. On the other hand, lesser amounts of such polyamide-imide compositions can be used to improve or modify properties of other polymers; accordingly, blends containing such other resins as a dominant component also are contemplated. Miscible blends, also referred to as alloys, comprising the invented compositions and one or more additional polymeric resin components in various proportions also can yield desirable results. Usually, blends are prepared by melt blending of the polymeric components although dry blending and solution blending can also be conducted in lieu of or to facilitate melt blending. Preferably, due to the high viscosity of the invented compositions at temperatures employed in melt blending, a high shear mixer such as a twin-screw extruder is employed for melt blending.

Filled compositions according to the invention can include particulate or fibrous fillers or reinforcing materials. Suitable particulate fillers include glass beads, graphite powder and various mineral fillers such as talc, wallastonite and pumice. Suitable fibrous fillers or reinforcing materials include glass, graphite, boron, aramid and other fibers. Compositions intended for use in injection molding applications preferably contain up to about 40 weight percent particulate or fibrous materials or a combination thereof because at higher levels the high melt viscosity of the invented polymers together with the viscosity-increasing affect of fibers and particulates make processing difficult. Higher filler levels, e.g., up to about 60 weight percent, are suitable for molding compounds for compression molding, e.g., chopped fiber molding compositions. Filler levels can be increased through use of suitable flow-improvers or processing aids. For injection molding compositions, preferred glass fibers are those made of alkali-free, boron-silicate glass (E-glass) or alkali-containing C-glass, average diameter of the fibers preferably being between about 3 and about 30 microns. It is possible to use both long fibers with an average length of from 5 to 50 millimeters and also short fibers with an average filament length of from 0.05 to 5 millimeters. In principle, any standard commercial-grade fibers can be used.

The particulate- or fiber-containing compositions can be prepared in various ways. For example, so-called roving or endless-glass fiber strands can be coated with softened polymer or a solution of polymer and subsequently solidified and granulated. Cut or chopped fibers or particulates can be mixed with granulated polymer and the resulting mixture plasticated in a conventional extruder or, alternatively, the fibers or particulates can be directly introduced into the softened polymer through a suitable inlet in an extruder.

Compositions according to the invention also include those in the form of composites comprising a fibrous substrate impregnated with a matrix resin component comprising the above-described polyamide-imides, including amic acid precursors thereto. Such composites can be provided in the form of a single layer of matrix resin-impregnated substrate, also referred to as prepreg, or as substantially void-free, consolidated structures comprising one or more such layers.

Suitably, the fibrous substrate of such composites is a woven or non-woven fabric or unidirectional tape or ribbon comprising continuous fibers. Preferably such fibers have a modulus of at least 8,000,000 psi and are thermally stable to at least 500° F. (260° C.) for at least about ten minutes in order to obtain composites of high strength, the fibers of which resist degradation at temperatures employed in processing, e.g., by compression molding. The term "thermally stable" means the fiber does not emit volatiles to such an extent as to cause voids in the final composite structure. Such thermally stable fibers as silicon nitride, silicon carbide and other ceramic fibers, glass, alumina, boron, Kevlar, graphite, quartz, and carbon fibers are useful as are combinations thereof. Carbon fibers, including graphite fibers, are especially preferred.

For purposes hereof, carbon fibers include graphite fibers as well as amorphous carbon fibers which result after a thermal carbonization or graphitization treatment. Graphite fibers consist substantially of carbon and have a predominant X-ray diffraction pattern characteristic of graphite. Amorphous carbon fibers, on the other hand, are fibers in which the bulk of the fiber weight can be attributed to carbon and which exhibit a predominantly amorphous X-ray diffraction pattern. Graphite fibers generally have a higher Young's modulus than do amorphous carbon fibers and in addition are more highly electrically and thermally conductive.

Carbon fibers typically employed in preparing the composites described herein contain at least about 90 percent carbon by weight. In a preferred embodiment, the carbon fibers contain at least about 95 percent carbon by weight and exhibit a predominantly graphitic X-ray diffraction pattern. Various commercially available carbon fibers are suitable according to the invention, examples being THORNEL® T300, T500 and T650/42 Carbon Fibers available from Amoco Performance Products, Inc.

As stated above, the fibrous substrate comprising such fibers can be in the configuration of a ribbon or tape which may comprise a single flat tow of continuous filaments or a plurality of substantially parallel multifilament fiber bundles which are substantially coextensive with the length of the ribbon. In the latter embodiment, the fiber bundles of the ribbon may be provided in a variety of physical configurations. For instance, the bundles of the ribbon may assume the configuration of continuous lengths of multifilament yards, tows, strands, cables, or similar fibrous assemblages. The multifilament bundles are preferably lengths of a continuous multifilament yarn. The fiber bundles within the ribbon optionally are provided with a twist that tends to improve their handling characteristics. For instance, a twist of about 0.1 to 5 turns per inch, and preferably about 0.3 to 1.0 turns per inch, may be imparted to each fiber bundle. Also, a false twist may be used instead of or in addition to a real twist. Alternatively, the fiber bundles can be without twist.

Multifilament fiber bundles may be provided within the ribbon in a substantially parallel manner in the substantial absence of bundle crossovers to produce a flat ribbon. The number of parallel multifilament bundles present within, for example, a ribbon may be varied widely, e.g., from 6 to 1,000 or more. In one embodiment, a ribbon is selected having a weft pick interlaced with substantially parallel fiber bundles in accordance with the teachings of commonly assigned U. S. Pat. No. 3,818,082, which is herein incorporated by reference. It is not essential, however, that the parallel fiber bundles or the filaments of a flat tow be bound by any form of weft interlacement when constructing fiber tapes for resin impregnation in accordance with the procedures described herein.

Fibrous substrates in the form of woven fabric are provided by weaving fibers on a loom or other suitable apparatus. Generally, any suitable fabric comprising fibers of the type described herein can be employed. Conveniently, a plain weave fabric is employed although leno, knit, harness and other weaves can be used. Preferably, fibers are coated with a suitable sizing agent, as described further below, before weaving to facilitate the weaving process and avoid or minimize loss of fiber properties.

Non-woven fabrics also are suitable fibrous substrates although the strength of such fabrics typically is less than that of woven fabrics and unidirectional tapes; accordingly, use of non-woven fabric substrates is not preferred in applications having rigorous requirements as to strength. For less demanding applications or those in which a non-woven substrate is used in combination with substrates in other configurations, any suitable non-woven fabric comprising the above-described fibers can be used. Commercially available non-woven fabrics often contain a binder that is not compatible with the matrix resin component of the present invention; accordingly, it may be desirable to remove such binder and apply suitable replacement binder, such as a polyamide-imide.

Irrespective of the configuration of the fibrous substrate, it is contemplated to apply a sizing material to the fibers of the substrate to improve adhesion between fibers and matrix resin component. The particular sizing agent to be used is selected based on compatibility with the matrix resin in terms of adhesion and stability relative to the environments to be encountered in preparing and further processing of composites. Examples include various polyamide-imides, polyamide-amic acids and amorphous and semicrystalline polyamides. Preferred sizing agents are polyamide-imides and amic acid precursors thereto prepared from aromatic diamines and trimellitic anhydride or its acyl chloride, as disclosed in European Patent Application No. 85305890.7 published Mar. 26, 1986, and particularly those prepared from trimellitic anhydride or 4-trimellitoyl anhydride chloride or a combination thereof and a combination of oxybis-aniline and meta-phenylenediamine. Use of the polyamide-imides of this invention as a sizing agent also is contemplated.

Sizing agent can be applied to individual fibers or to multiple fibers, as in bundles, tapes, ribbons or fabrics, by various techniques. For example, fibers can be drawn through a bath containing a solution of the sizing agent or by spraying such a solution onto the fibers and then drying the fibers to substantially remove the solvent. A suitable apparatus for coating the fibers with sizing agent is illustrated in U.S. Pat. No 3,914,504, which is incorporated herein by reference. Application of sizing agent in molten or softened condition to the fibers also is contemplated although this technique is subject to limitations in that the high melt viscosity of certain sizing compositions makes substantial wetting of fibers difficult or uneconomical.

It is preferred that sizing agent be applied by passing fibers through a bath containing a solution of the agent in a suitable solvent. This method allows the amount of sizing agent coated onto the fiber to be readily controlled. The presence of solvent improves the ability of the sizing agent to penetrate a staple yarn, filament yarn, tape, fabric or roving, thereby promoting substantial wetting and coating of individual fibers. Concentration of the sizing agent in the solvent is usually in the range of from about 0.05 to about 10 percent, and preferably from about 0.5 to about 5 percent, by weight based on the total weight of the solution.

The solvent used should be capable of dissolving sufficient quantities of the sizing agent to allow efficient coating of the fiber and also be nonreactive with the sizing agent. When using polyamide-imide sizing agent, examples of suitable solvents are N-methylpyrrolidone, N,N-dimethylformamide, methyl ethyl ketone, N,N-dimethylacetamide and mixtures thereof. Other materials to aid in subsequent removal of solvent, such as methylene chloride, can be added to the solvent.

The amount of sizing agent on the fiber will depend on the configuration of the fiber during application, i.e., whether the fiber is in the form of a bundle, fabric or the like. For a continuous fiber or filament, the amount of sizing agent or coating will ordinarily range from about 0.05 to about 1.5 percent by weight based on the fiber. For a tape or ribbon of substantially unidirectional fibers, the amount of sizing agent or coating will ordinarily range from about 0.05 to about 1 percent by weight of the tape or ribbon weight. For a chopped or staple fiber, the amount of sizing agent or coating will ordinarily be less than about 6 percent by weight based on the fiber. A treated fabric will ordinarily contain an amount of sizing agent or coating from about 0.2 to about 1.8 percent by weight based on the fabric weight.

Typically, after application of sizing agent by spraying fibers or passing the same through solution containing the sizing agent, the coated fibers are heated, such as by passage through a heated tube, to remove the solvent and dry the sized fiber. Most conveniently, the tube is heated by hot air. Continuous fiber for woven fabric preferably is sized prior to weaving into fabric.

Commercially available fibers and fabrics often include a sizing agent that is not compatible with the matrix resin component of the composites according to this invention. For example, epoxy and polyimide sizes commonly used with commercial carbon or other fibers are not compatible because both emit volatiles at temperatures employed in molding or consolidating the composite compositions according to this invention. Solvent washing, heat-cleaning or other suitable techniques can be conducted for removal of incompatible size from carbon fiber woven fabrics and composite properties are significantly improved due to such removal. Optimum properties, however, are achieved by using unsized fibers, applying to such fibers a sizing agent compatible with the matrix resin component, weaving the sized fiber into a fabric, and impregnating the resulting fabric with matrix resin component to form a composite prepreg for consolidation.

The consolidated polyamide-imide composite compositions according to this aspect of the invention can be described as a heterogeneous assembly comprising a continuous phase of matrix component and the above-described fibrous substrate firmly bonded to the matrix component and, preferably, contiguous therewith.

Composite prepregs according to the invention contain sufficient levels of fibrous substrate to provide consolidated composites of desired mechanical properties and sufficient matrix component to provide satisfactory bonding of the substrate and integrity. Preferably, in such composite prepregs and consolidated structures about 50 to about 75 weight percent fibrous substrate and about 25 to about 50 weight percent matrix resin component are present. More preferably, to achieve good mechanical properties with suitable bonding of the substrate and matrix components, about 60 to about 70 weight percent substrate and about 30 to about 40 weight percent matrix resin component are present.

Due to the excellent hydroscopic properties of the invented polyamide-imides, consolidated composites comprising the same exhibit superior retention of mechanical properties even when saturated with water. Accordingly, the invented, consolidated composites are significantly improved relative to conventional polyamide-imide composites in terms of susceptibility to thermal shock and utility at high temperatures.

Polyamide-imide composite prepregs according to the invention are prepared by impregnating a fibrous substrate component as described above with matrix resin component comprising the above-described polyamide-imide composition, including amic acid precursors thereto, in a state effective to achieve substantial wetting of the fibers of the substrate with matrix resin component and solidifying the matrix component. Such composite prepregs can be consolidated by application of heat and pressure to form shaped, substantially void-free composite parts.

Impregnation of the substrate can be accomplished by melt or solution techniques, the latter being preferred from the standpoint of optimum wetting of fibers and integrity and strength of the final composite. Preferably, impregnation by either such technique is conducted using matrix resin component comprising a polyamide-imide composition according to the invention having Acid Titre values of at least about 1 milliequivalent COOH per gram polymer to facilitate the impregnation. Because Tg and melt viscosity decrease and solubility increases with increased amic acid content, substantial amic acid content, as indicated by such Acid Titres, facilitates both solution and melt impregnation as well as subsequent molding operations. More preferably, polyamide-imide compositions having Acid Titre of at least about 1.4 milliequivalents COOH per gram are employed to facilitate solution impregnation.

Solution impregnation is accomplished by forming a solution of matrix component in a suitable solvent in a concentration effective to achieve substantial wetting of the fibers of the substrate and applying the solution to the fibrous substrate. Preferably, prior to consolidation of the impregnated substrate, at least a substantial portion of the solvent is removed because volatilization of solvent during consolidation can adversely affect composite properties.

Suitable solvents for forming the impregnation solution of matrix resin component are materials in which the invented polymers are at least partially soluble and that are capable of being at least substantially removed after impregnation without adversely affecting the substrate or matrix resin components. Preferably, a nitrogen-containing, polar, organic solvent such as N,N-methylpyrollidone, dimethylacetamide, N,N-dimethylformamide, or a combination thereof is employed. Diglyme also is a suitable solvent. N-methylpyrrolidone is most preferred because the invented polyamide-imide compositions exhibit desirable solubility therein and it is sufficiently volatile that costly and complicated solvent removal procedures are not necessary.

Concentration of matrix resin component in the impregnating solution is sufficiently low to achieve good wetting of fibers of the substrate and sufficiently high to yield adequate levels of impregnated matrix component after solvent removal. Preferably, solids content of the impregnating solution is about 15 to about 70 weight percent. Precise concentrations within this range can be varied depending on the type and characteristics of the fibrous substrate. For plain weave fabrics having areal weights of about 180 to about 220 $g/m^2$, preferred solids contents range from about 25 to about 40 wt.%.

Impregnation can be accomplished by passing the fibrous substrate through a bath of the impregnation solution or applying the solution to the substrate and working it into the same, or by other suitable means. The impregnation is controlled so as to yield the desired proportion of matrix resin and substrate in the final composite prepreg. Preferably a bath of the solution is employed with the rate of passage of the substrate therethrough being controlled to achieve suitable wetting of the fibers of the substrate.

Removal of at least a substantial portion of the solvent can be accomplished by heating the impregnated substrate or applying a vacuum thereto to volatilize the solvent. Most simply, an oven or heated tube is employed for solvent removal. Removal of solvent from the impregnated substrate is desirable because the presence of solvent during subsequent processing of composites can create voids or cracks in the final product. Accordingly, it is preferred to remove sufficient solvent to yield an impregnated substrate or composite prepreg containing a maximum of about 5 wt.% solvent, such removal most preferably being accomplished by heating at about 175 to about 350° C. for about 5 minutes to about 2 hours.

While solvent impregnation is preferred to obtain most effective wetting of fibers and, accordingly, most uniform impregnation, impregnation of the fibrous substrate may be conducted with matrix component in a softened state, for example, by applying the softened matrix component or a film or sheet of solid matrix component to the substrate and applying heat and pressure as needed to soften such a film or sheet and cause flow of resin into the substrate. Following such impregnation, the impregnated substrate is cooled to below Tg of the matrix component to solidify the softened polymer.

Fabrication of parts from such composite prepregs, irrespective of impregnation technique, is conducted by subjecting one or more layers or plies thereof to sufficient heat and pressure to consolidate the matrix component within and between such layer or layers.

Most suitably, consolidation is accomplished by compression or autoclave molding wherein one or more layers of composite prepreg are placed into a mold or onto a form of desired configuration and the mold or form is heated sufficiently to render the matrix component flowable though not so high as to degrade the matrix component. Preferably, all or a substantial portion of the heating is performed before pressurizing to promote removal of minor amounts of solvent that may remain in the composite. Heatup rate is not critical. Pressure is applied to affect flow of the matrix component between fibers within and between the layer or layers of composite prepreg. Such conditions are maintained for a period of time effective to yield essentially void-free fusion within and between the layer or layers. Preferably, heating is at about 35 to about 125° C. above Tg of the matrix resin component and pressures are about 100 to about 1500 psi to achieve sufficient softening and flow without degradation of matrix component, the hold time under such conditions preferably ranging from about 1 to about 100 minutes. If desired, hold times can be extended without adversely affecting composite properties. Generally, longer hold times are used for thicker parts and shorter times for thinner parts.

Subsequently, the mold or form is cooled to below Tg, preferably at a rate of about 2 to about 10° F. per minute to solidify the matrix component and then the cooled fabricated composite part is removed from the mold or form. Cooldown rate can generally range up to about 30° F. per minute.

Such fabricated composite parts are well suited as replacements for metals in various applications owing to their light weight, inherent flame resistance, excellent mechanical, chemical and thermal properties and retention thereof at elevated temperatures. If desired, further improvement in properties can be achieved by so-called annealing techniques comprising heating under controlled conditions to achieve imidization and chain extension of the molecules within the matrix component beyond levels attained during the molding process. Stepwise heating from about 200° C. up to about 300° C. for a period of about 10 to about 50 hours per step is suitable for achieving such annealing as is stepwise heating in accordance with commonly assigned U.S. Pat. No. 4,167,620 which is incorporated herein by reference.

Advantageously, fabricated composite parts according to the invention can be joined with other such parts or other materials with suitable mechanical fasteners or adhesives or by fusion. A scrim of matrix component-impregnated, woven fabric comprising high strength fibers can also be used to join such parts by placing the scrim between the parts to be joined and heating with pressure to consolidate. Thus, large composite structures such as aircraft wing skins, can be fabricated despite limitations on size and configuration of currently available molding equipment. The present invention is illustrated by the following examples, it being understood that the same are for purposes of illustration and not limitation. Materials used in these examples were obtained from the following sources:

N-methylpyrrolidone ("NMP")—GAF Corporation;

2,2-bis(4-(p-aminophenoxy)phenyl)propane ("BAPP")—Mallinckrodt, Inc. or Mitsui Toatsu Chemicals, Inc.;

trimellitic anhydride ("TMA") —Amoco Chemicals Company;

4-trimellitoyl anhydride chloride ("TMAC") —Amoco Chemicals Company;

pyromellitic acid dianhydride ("PMDA") —Aldrich Chemical Company or Daicel Chemical Industries, Ltd.;

biphenyltetracarboxylic acid dianhydride ("BPDA") —Mitsubishi Chemical Industries, Ltd.; 1,2,4 trimellitic trichloride ("TMTC") —Twin Lakes Chemical, Inc.;

1,12-diaminododecane ("DADD") —Aldrich Chemical Company;

1,3-bis(3-aminophenoxy)benzene ("1,3,3-APB") —Mitsui Toatsu Chemicals, Inc.;

1,3-bis(4-aminophenoxy)benzene ("1,3,4-APB") —Mitsui Toatsu Chemicals, Inc.

EXAMPLE 1

To a three-neck, two-liter flask equipped with mechanical stirrer, nitrogen purge and inlet port were added about 750 grams NMP followed by 292.3 grams (0.712 mole) BAPP and 7.52 grams (0.0392 mole) TMA. The contents were stirred for about one-half hour with the stirrer set at maximum speed, nominally 360 rpm, to dissolve the BAPP and TMA and then 54.4 grams PMDA were added over a fifteen-minute period with stirring. Contents of the flask were heated to 58° C. (137° F.) using a heating mantle and stirring was continued at that temperature for one hour. All of the components were in solution at the end of that time. The solution then was cooled to 21° C. (70° F.) by replacing the heating mantle with a 18° C. (65° F.) water bath. A solution prepared by adding 100 grams NMP to 89.2 grams (0.424 mole) molten TMAC that had been heated to about 100° C. using a hot plate was added slowly to the flask, the contents thereof being maintained below 34° C. (94° F.) by immersing the flask in a 18° C. (65° F.) water bath. After about forty-five minutes, addition of the TMAC solution was complete, the water bath was removed and the reaction mixture was heated to 50° C. (122° F.) using a heating mantle while stirring and then maintained at that temperature for 45 minutes with stirring. The contents of the flask then were cooled to 21° C. (70° F.) using a water bath and 30.0 milliliters (0.444 mole) propylene oxide ("PO") were added to scavenge hydrogen chloride liberated due to reaction of the 4-TMAC and BAPP. Reaction of hydrogen chloride with PO was allowed to continue for fifteen minutes keeping the temperature below 32° C. (90° F.) during that time using a water bath. At the end of the fifteen minutes the contents of the flask were heated to 93° C. (200° F.) using a heating mantle and held at that temperature for 30 minutes to drive off unreacted PO.

Inherent viscosity of the resulting polymer as a 0.5 wt.% solution in NMP was 0.28 dl/g at 25° C. (77° F.). Acid Titre was 2.45 milliequivalents COOH/gram of polymer as determined by titration with alcoholic sodium methoxide solution.

EXAMPLES 2-14

Compositions were prepared from 975-1150 grams total NMP, 292.3 grams BAPP (492.0 and 143.7 grams, respectively in EXAMPLE 6) and varying amounts of PMDA, TMA and TMAC to provide the mole percentages shown in TABLE 1. Inherent viscosities and Acid Titres of the polymer solutions, determined as in EXAMPLE 1, also are reported in the table. In general, the procedure in these examples was essentially the same as in EXAMPLE 1 except as indicated above and below:

EXAMPLE 2: BAPP and TMA in about 535 grams NMP were heated to 48°-52° C. (118°-126° F.). PMDA was dissolved in 48 grams NMP by adding the PMDA to NMP heated to 48°-52° C. (118°-126° F.) after which the PMDA-NMp solution was added to the reaction flask maintained at 48°-52° C. (118°-126° F.) and the contents were stirred at that temperature for 20 minutes. The solution then was cooled to 27°-35° C. (85°-95° F.) and a solution of TMAC in 270 grams NMP was added slowly, keeping temperature below 34° C. (94° F.) with a water bath. The amount of PO was 45.5 milliliters (0.673 mole).

EXAMPLE 3: After addition of TMAC in NMP and heating to 50° C. (122° F.), temperature was maintained for 30 minutes. The amount of PO was 32.9 milliliters (0.486 mole).

EXAMPLE 4: The amount of PO was 32.6 milliliters (0.482 mole).

EXAMPLE 5: EXAMPLE 1 was repeated.

EXAMPLE 6: BAPP and TMA in about 275 grams NMP were heated to 52°-54° C. (125°-130° F.) PMDA was dissolved in 72 grams NMP that had been heated to 63° C. (145° F.) in a separate flask and the solution was added incrementally to the reaction flask immersed in a 18° C. (65° F.) water bath. The water bath was removed on completion of the addition and the contents of the flask were held at 50° C. (122° F.) for 20 minutes with stirring. The amount of PO was 9.94 milliliters (0.147 mole).

EXAMPLE 7: BAPP and TMA in about 300 grams NMP were heated to 48°-52° C. (118°-126° F.) PMDA was dissolved in 466 grams NMP by adding the PMDA to NMP heated to 48°-52° C. (118°-126° F.) after which the PMDA-NMP solution was added to the reaction flask as in EXAMPLE 6 but with the temperature maintained at 48°-52° C. (118°-126° F.) during the addition. After completion of the addition the contents of the flask were held at 50° C. (122° F.) using a heating mantle while stirring for 20 minutes. The solution then was cooled to 27°-35° C. (85°-95° F.) and a solution of TMAC in 133 grams NMP was added slowly, keeping temperature below 34° C. (94° F.) with a water bath. The amount of PO was 19.3 milliliters (0.332 mole).

EXAMPLE 8: The procedure of EXAMPLE 7 was followed substantially except that the TMAC was dissolved in 144 grams NMP and the amount of PO was 24.3 milliliters (0.358 mole).

EXAMPLE 9: The procedure of EXAMPLE 7 was followed substantially except that the PMDA was dissolved in 466 grams NMP, the TMAC was dissolved in 129 grams NMP and the amount of PO was 21.7 milliliters (0.322 mole).

EXAMPLE 10: The procedure of EXAMPLE 7 was followed substantially except that the PMDA was dissolved in 559 grams NMP, the TMAC was dissolved in 104 grams NMP and the amount of PO was 17.4 milliliters (0.257 mole).

EXAMPLE 11: The procedure of EXAMPLE 10 was followed substantially except that the TMAC was dissolved in 114 grams NMP and the amount of PO was 19.2 milliliters (0.284 mole).

EXAMPLE 12: The procedure of EXAMPLE 7 was followed substantially except that the PMDA was dissolved in 652 grams NMP, the TMAC was dissolved in 60 grams NMP and the amount of PO was 10.1 milliliters (0.150 moles).

EXAMPLE 13: The procedure of EXAMPLE 7 was followed substantially except that the PMDA was dissolved in 545 grams NMP, the TMAC was dissolved in 84 grams NMP and the amount of PO was 142 milliliters (0.210 mole).

EXAMPLE 14: The procedure of EXAMPLE 7 was followed substantially except that the PMDA was dissolved in 466 grams NMP, hold time at 50° C. (122° F.) after addition of the PMDA solution was 45 minutes and after such heating about one-half the contents of the flask was removed and the removed portion of the polymer solution, identified as 14A in Table 1, was analyzed, the remaining contents being heated to 93° C. (200° F.) and held at that temperature for 30 minutes, that polymer solution being identified as 14B in TABLE 1. No PO was used.

For convenient reference, TABLE 1 also includes mole percentages and results for Example 1. In the table, inherent viscosity and Acid Titre, determined as in EXAMPLE 1, are abbreviated "IV" and "AT" respectively. PMDA, TMA and TMAC contents are reported in mole percents, based on total moles of PMDA plus TMA plus TMAC.

TABLE 1

| EXAMPLE | BAPP (mole %) | PMDA (mole %) | TMA (mole %) | 4-TMAC (mole %) | IV (dl/g) | AT (meq/g) |
|---------|---------------|---------------|--------------|-----------------|-----------|------------|
| 1 | 100.0 | 35.0 | 5.5 | 59.5 | 0.28 | 2.45 |
| 2 | 100.0 | 5.0 | 5.0 | 90.0 | 0.29 | 1.45 |
| 3 | 100.0 | 25.0 | 10.0 | 65.0 | 0.28 | 2.23 |
| 4 | 100.0 | 30.0 | 5.5 | 64.5 | 0.32 | 2.20 |
| 5 | 100.0 | 35.0 | 5.5 | 59.5 | 0.37 | 2.31 |
| 6 | 100.0 | 50.0 | 10.0 | 40.0 | 0.23 | 2.59 |
| 7 | 100.0 | 50.0 | 5.5 | 44.5 | 0.40 | 2.44 |
| 8 | 100.0 | 50.0 | 2.0 | 48.0 | 0.40 | 2.16 |
| 9 | 100.0 | 55.0 | 2.0 | 43.0 | 0.30 | 2.45 |
| 10 | 100.0 | 60.0 | 5.5 | 34.5 | 0.40 | 2.42 |
| 11 | 100.0 | 60.0 | 2.0 | 38.0 | 0.42 | 2.45 |
| 12 | 100.0 | 70.0 | 10.0 | 20.0 | 0.31 | 2.82 |
| 13 | 100.0 | 70.0 | 2.0 | 28.0 | 0.42 | 2.79 |
| 14A | 100.0 | 80.0 | 20.0 | 0 | 0.30 | 3.33 |
| 14B | 100.0 | 80.0 | 20.0 | 0 | 0.21 | 3.07 |

EXAMPLES 15-17

For purposes of comparison, preparation and properties of compositions prepared without PMDA or with an aminophenoxybenzene instead of BAPP are presented below and in TABLE 2. These examples followed the following procedures:

EXAMPLE 15: No PMDA was used in this example. 292 grams BAPP and 2.73 grams TMA were dissolved in about 600 grams NMP as in Example 1 and the solution was heated to 29°-35° C. (85°-95° F.) 146.9 grams TMAC were dissolved in 294 grams NMP and slowly added to the reaction flask while maintaining its contents below 34° C. (94° F.) using a water bath as in EXAMPLE 1. After the addition the solution was heated to 50° C. (122° F.) and held at that temperature for 45 minutes with stirring. Cooling of the solution and addition of PO were as in EXAMPLE 1 except the amount of PO was 50.0 milliliters (0.739 moles). Polymer solution was analyzed as in EXAMPLE 1.

centages, relative to total acid component, shown in TABLE 3. Inherent viscosities and Acid Titres also are shown in TABLE 3.

TABLE 3

| EXAMPLE | BAPP (mole %) | PMDA (mole %) | TMA (mole %) | TMAC (mole %) | IV (dl/g) | AT (meq/g) |
|---|---|---|---|---|---|---|
| 19 | 100.0 | 35.0 | 25.0 | 40.0 | 0.17 | 2.56 |
| 20 | 100.0 | 35.0 | 20.0 | 45.0 | 0.21 | 2.47 |
| 21 | 100.0 | 35.0 | 15.0 | 50.0 | 0.24 | 2.25 |
| 22 | 100.0 | 35.0 | 10.0 | 55.0 | 0.29 | 2.13 |
| 23 | 100.0 | 35.0 | 5.5 | 59.5 | 0.30 | 2.27 |

EXAMPLE 16: 1,3,4-APB was substituted for BAPP in this example and the procedure of EXAMPLE 8 was followed substantially except that a one-liter flask was used, 58.4 grams 1,3,4-APB and 0.77 gram TMA dissolved in about 75 grams NMP were heated to 50° C. (122° F.), 21.8 grams PMDA were dissolved in 131 grams NMP, hold time at 50° C. (122° F.) after addition of the PMDA solution was sixty minutes after which the contents of the flask were cooled to 29° C. (84° F.) and 20.2 grams TMAC dissolved in 40 grams NMP were added, the amount of PO was 6.8 milliliters (0.102 mole) and temperature during the PO-hydrogen chloride reaction was kept below 29° C. (84° F.)

EXAMPLE 17: 1,3,3-APB was substituted for BAPP in this example. The procedure of EXAMPLE 1 was followed substantially except that temperature was increased to 61° C. (142° F.) after addition of 62.1 grams PMDA to a solution of 207.9 grams 1,3,3-APB and 7.52 grams TMA in NMP, the amount of TMAC was 21.7 grams, total NMP was 791 grams and the amount of PO was 27.6 milliliters (0.41 mole).

TABLE 2

| EXAMPLE | DIAMINE (mole %) | PMDA (mole %) | TMA (mole %) | TMAC (mole %) | IV (dl/g) | AT (meq/g) |
|---|---|---|---|---|---|---|
| 15 | 100.0 | 0.0 | 2.0 | 98.0 | 0.25 | 1.38 |
| 16 | 100.0 | 50.0 | 2.0 | 48.0 | 0.44 | ND* |
| 17 | 100.0 | 40.0 | 5.5 | 54.5 | 0.21 | 3.06 |

*In this and all other tables "ND" indicates that the property in question was not determined for the example in question

EXAMPLE 18

A polymer was prepared from BPDA as the aromatic tetracarboxylic acid component, TMA and TMAC at 50.0/5.0/45.0 mole % based on total acid component. The preparation followed essentially the procedure of EXAMPLE 7 except that the BPDA was mixed with about 140 grams NMP, heated to 77° C. (170° F.) and then the mixture was added incrementally to the solution of BAPP and TMA in NMP, maintaining temperature at 50° C. (122° F.) during the addition and for 45 minutes after completion thereof; the TMAC was dissolved in 68 grams NMP; and 11.4 milliliters (0.168 mole) PO were used.

The resulting polymer solution had an IV of 0.30 dl/g and Acid Titre of 0.42 meq/gram, both determined as in EXAMPLE 1.

EXAMPLES 19-23

To study the effect of relative proportions of trimellitic anhydride and 4-trimellitoyl anhydride chloride on product properties, a series of preparations was conducted following essentially the procedure of EXAMPLE 6 using 480-490 grams total NMP, 143.7 grams BAPP, 26.7 grams PMDA, about 10-15 grams PO and amounts of TMA and TMAC providing the mole per- As can be seen from TABLE 3, at constant PMDA concentration, IV decreased with increasing TMA concentration. This trend also is shown by comparison of IVs for EXAMPLES 6-8 and for EXAMPLES 10 and 11 and for EXAMPLES 12 and 13 as reported in TABLE 1. By balancing PMDA and TMA levels, it is possible to prepare compositions according to the invention that combine the high Tgs and desirable hydroscopic properties imparted by higher levels of PMDA without sacrifices in processibility that otherwise might result from the greater melt viscosity resulting from such higher levels of PMDA.

EXAMPLES 24-26

In these examples polymer solutions were prepared following essentially the procedure of previous examples but employing different quantities of solvent and reactants and additional components as described below and in TABLE 4.

EXAMPLE 24: This example followed essentially the procedure of EXAMPLE 6, using a 2-liter flask, except that 19.1 grams PMDA were added as solid after which temperature was increased to 66° C. (150° F.) and then decreased to 58° C. (137° F) and held there for one hour with stirring; after cooling to 21° C. (70° F.) a solution made by adding 0.92 grams TMTC to 46.8 grams TMAC dissolved in 100 grams NMP was added slowly to a cooled solution of PMDA, 143.7 grams BAPP and 6.72 grams TMA in about 350 grams NMP; and the amount of PO was 16.5 milliliters (0.244 mole).

EXAMPLE 25: The procedure of EXAMPLE 24 was followed except that about 350 grams NMP, 143.7 grams BAPP, 17.1 grams PMDA, 6.72 grams TMA, 39.1 grams TMAC, 7.39 grams TMTC and 19.1 milliliters (0.282) mole PO were used.

EXAMPLE 26: This example followed essentially the procedure of EXAMPLE 1 except that 3.7 grams TMA and 43.9 grams TMAC were used. 3.5 grams DADD were added with 26.7 grams PMDA to 136.5 grams BAPP and 3.7 grams TMA dissolved in about 500 grams NMP, after which temperature was increased to 58° C. (150° F.) and the amount of PO was 14.8 milliliters (0.219 mole).

Mole percents and properties are reported in TABLE 4.

TABLE 4

| EXAMPLE | BAPP (mole %) | PMDA/TMA/TMAC (mole %) | OTHER (mole %) | IV (dl/g) | AT (meq/g) |
|---|---|---|---|---|---|
| 24 | 100.0 | 25.0/10.0/63.5 | 1.0 TMTC | 0.21 | 2.41 |
| 25 | 100.0 | 25.0/10.0/53.0 | 8.0 TMTC | 0.18 | 2.18 |
| 26 | 100.0 | 35.0/5.5/59.5 | 5.0 DADD | 0.30 | 2.53 |

COMPOSITE PREPARATION

Polyamide-imide composites were prepared from polymer solutions prepared in EXAMPLES 1–26 by impregnating a fibrous substrate of woven graphite fibers with the solutions to yield composite prepreg and then molding plies of prepreg according to the following general procedure.

The fibrous substrate was a plain weave fabric having 12 pick fiber strands per inch and 12 fill fiber strands per inch woven from commercially available graphite fibers identified as Celion 3000 graphite fibers having a modulus of 30 million psi and 3000 fibers per strand. Prior to weaving the fiber strands were sized with one weight percent, based on fiber weight, of a polyamide-imide sizing agent by passing the fiber strands through a 1 wt. % solids content solution in NMP of a polyamide-imide prepared from TMAC and a diamine component containing 70 mole % oxybisaniline and 30 mole % metaphenylene diamine and then heating to drive off the NMP.

Coating of the woven fabric was accomplished by taping the fabric to a masonite board covered with polyethylene film. Polymer solution as prepared in the examples was then poured onto the fabric and spread over its surface, working it into the fabric with a 5-inch long polypropylene plaque. The polymer solution was worked both longitudinally and laterally into the fabric. After an even coating was obtained the wet fabric was allowed to air dry for approximately one week. The dried fabric was further dried in a laboratory oven at 135° C. (275° F.) for 33 minutes, 160° C. (320° F.) for 11 minutes, 177° C. (350° F.) for 33 minutes, and finally 191° C. (375° F) for 11 minutes. The resulting, dried prepreg was subsequently cut into sheets approximately seven inches by ten inches.

Molding of prepreg into a consolidated composite for testing was conducted by compression press molding. Composite prepregs prepared from the polymer solutions prepared in EXAMPLES 7 and 13 were not molded because molding of prepregs made from polymer solutions in other examples (e.g., EXAMPLES 6 and 12, respectively) of comparable PMDA content but higher TMA content were molded and it was not anticipated that the lower TMA content materials would show significantly improved properties due to the better flow during molding of the higher TMA content polymers. The prepreg prepared from the polymer solution of EXAMPLE 10 were not molded for unknown reasons. In the case of the remaining prepregs, the dried prepreg sheets were tacked with a soldering iron into layers of 6 or 12 plies by heating a corner of the stacked sheets to fuse them together at a corner. The tacked stack was then assembled into a layup for vacuum bag, compression press molding. The assembly consisted of the prepreg stack, having a type J thermocouple wire inserted between plies at an edge, on a 0.125-inch thick stainless steel caul plate coated with a mold release agent identified as Frecote 44, with layers of 3-inch fiberglass tape being disposed on the plate around the perimeter of the prepreg stack. Beneath the caul plate were placed a layer of woven fiberglass fabric identified as 181 Fiberglass, and polyimide film identified as 200H Kapton film. Above the prepreg stack were placed a porous release fabric of silicon-treated fiberglass identified as Airteck Bleeder-Lease E, followed by woven fiberglass fabric identified as 120 Fiberglass, followed by 181 Fiberglass, using two layers when molding 12 plies of prepreg and one layer for 6 plies, followed by a woven fiberglass fabric identified as Airweave HP Fiberglass and, finally, a topmost layer of 200H Kapton film having a vacuum port inserted therein. The upper and lower films were then sealed together to form a bag around the assembly with adhesive tape identified as GS213 Airteck Sealant Tape.

The sealed assembly was connected to a vacuum pump to degas the bag and check for leaks. The assembly was then placed into a 200 Ton Tetrahedron Hot Platen Compression Press. The press platens were closed just short of making contact with the assembly. The press platens then were heated to 630° F. at a rate of 5°–10° F./minute and then full pressure was applied and heating was continued. Pressure and temperature were held for 15 minutes after which temperature was reduced at about 20° F. per minute under full pressure until temperature reached 300° F., at which time the press pressure and the vacuum were released and the part was removed from the press and vacuum bag.

During cooldown of the part from the 300° F. demolding temperature to room temperature acoustic emissions were monitored using an AET 206U device. Acoustic emissions, measured as counts registered during the time of monitoring, together with count intensity can be indicative of cracking during cooldown.

For each sample molded, the number of plies molded, molding conditions, including maximum temperature and pressure, and acoustic emission measurements ("AE") are shown in TABLE 5.

EXAMPLE 27

A 100/45/10/45 mole % BAPP/TMAC/TMA/PMDA polyamideimide was prepared from 66 parts by weight BAPP, 15 parts by weight TMAC, 3 parts by weight TMA and 16 parts by weight PMDA, based on total weight of such reactants, in a large glass-lined kettle reactor as follows.

PMDA was mixed with 41 parts by weight, based on total reactant weight, of NMP and heated to approximately 60° C., during which time most of the PMDA dissolved.

132 parts by weight, based on total reactant weight, NMP were charged to the reactor along with the BAPP. TMA dissolved in 21 parts by weight, based on total reactant weight, NMP was poured into the kettle after the BAPP had dissolved. The kettle was then heated to 38° C., at which time the PMDA-NMP solution was slowly poured into the kettle. The temperature was increased to 49° C. and held for 45 minutes. The solution appeared homogeneous at that time with no evidence of undissolved solids.

The reactants were then cooled to 24° C. and the TMAC was added slowly in flake form. The temperature was kept below 29° C. during the addition. The reaction mixture was then heated to 60° C. for 30 minutes.

The polymer then was precipitated using deionized water in a Fitzpatrick Mill. The ground polymer was then separated from the mother liquor with a centrifuge, washed eight times with distilled water and dried in a dessicant oven at 190° F. (88° C.) for about 48 hours.

The dried polymer was redissolved in 2.5 parts by weight NMP per part by weight polymer by incrementally adding the dried polymer to the NMP using an air mixer to stir the solvent and resulting solution. The solution was warmed to 60° C. and poured into a tank and 12 inch wide plain weave, sized carbon fiber fabric as used in previous examples was passed through the tank. A metering roll pair with a 28 mil gap setting was used to pass the fabric through the polymer solution in the tank. The fabric was pulled through the coating tank at a rate of 1.5 feet per minute, residence time in the tank being approximately 5 minutes.

Drying of the prepreg was accomplished by pulling the wetted, metered fabric through an infrared oven with 3 zones. The fabric temperature in the first zone was approximately 121° C. while the second and third zones were approximately 149° C. and 177° C., respectively. The volatiles level after impregnation and drying was approximately 10 weight percent based on weight of the impregnated substrate. To dry the prepreg further an additional pass through the infra-red oven was made at material temperatures of 177° C., 190° C. and 204° C. The second pass through the oven was done at approximately 2 feet per minute. The volatiles, primarily NMP, were reduced to about 3 weight percent by the second pass.

This prepreg was cut and molded as in the previous examples. Molding conditions are reported in Table 5.

TABLE 5

| | | Molding Conditions | | |
|---|---|---|---|---|
| EXAMPLE | No. Plies | Pressure (psi) | Maximum Temp. (°F.) | AE (counts/ minutes) |
| 1 | 12 | 1000 | 704 | 20/60 |
| 2 | 6 | 200 | 667 | 73/60 |
| 3 | 12 | 1000 | 666 | 70/60 |
| 3 | 6 | 200 | 661 | 184/60 |
| 4 | 12 | 1000 | 666 | 436/30 |
| 4 | 6 | 206 | 661 | 224/45 |
| 5 | 6 | 1000 | 704 | 146/60 |
| 6 | 6 | 1000 | 666 | 28/60 |
| 8 | 6 | 1000 | 663 | 6/60 |
| 9 | 6 | 1000 | 663 | 34/45 |
| 11 | 6 | 1000 | 663 | 1/60 |
| 12 | 6 | 1000 | 673 | 1267/60 |
| 14A | 6 | 1000 | 700 | 505/60 |
| 14B | 6 | 2000 | 700 | 488/60 |
| 15 | 6 | 200 | 645 | 21/60 |

TABLE 5-continued

| | | Molding Conditions | | |
|---|---|---|---|---|
| EXAMPLE | No. Plies | Pressure (psi) | Maximum Temp. (°F.) | AE (counts/ minutes) |
| 16 | 6 | 1000 | 735 | 1921/60 |
| 17 | 12 | 1000 | 661 | 12/30 |
| 18 | 6 | 1000 | 667 | 3/60 |
| 19 | 6 | 200 | 663 | 224/60 |
| 20 | 6 | 200 | 663 | 136/60 |
| 21 | 6 | 200 | 663 | 54/60 |
| 22 | 6 | 200 | 663 | 26/60 |
| 23 | 6 | 200 | 665 | 18/60 |
| 24 | 6 | 1000 | 663 | 128/60 |
| 25 | 6 | 1000 | 662 | 186/45 |
| 26 | 6 | 200 | 682 | 264/60 |
| 27 | 6 | 1000 | 668 | 1/60 |

After cooling, the molded composite was cut into four sections of approximately equal dimensions. A first section was evaluated in as-molded condition, that is, without further conditioning or treatment. A second section was tested in like manner but after soaking in water at about 71° C. (160° F.) until saturated, that is, until weight gain due to absorption of water stopped.

Properties of the as-molded and as-molded/saturated sections are reported in TABLES 6 and 7, respectively, wherein FS designates flexural strength determined at room temperature of about 21° C. ("RT") and at about 178° C. according to ASTM D790-84a, "FM" designates flexural modulus determined at RT and 178° C. according to ASTM D790-84a, "SBS" designates short beam shear determined at RT according to D-2344-76, Density was determined according to ASTM D1505, "NMP" designates residual N-methylpyrrolidone content determined by gas chromatography, "MR" designates microscopy rating, a visual observation of composite void content determined by viewing the sample under magnification of 100X and photomicrographs thereof and assigning a rating of 1 to 10 with a rating of 10 indicating no voids and rating of 1 indicating about 10% voids based on the area shown in the photomicrograph, and "H2O ABS" designates water absorption when saturated at about 71° C. (160° F.) determined by weighing of samples.

Composites molded from the composite prepreg prepared from the polymer solution of Example 2 were not evaluated other than for NMP and MR because NMP levels indicated insufficient removal of solvent to attain good composite properties. The EXAMPLE 5 molded composite was not so-evaluated because the polymer solution, prepreg and molded composite in that example were prepared the same as in EXAMPLE 1, the molded composite of which was so-evaluated. Molded composites from EXAMPLE 8, 9, and 11 were not tested because of the low TMA contents relative to PMDA of their respective polymers. The molded composite from EXAMPLE 16 was not tested because it was not consolidated in molding. Only as molded properties were determined for the composite from EXAMPLE 18.

TABLE 6

| | AS-MOLDED PROPERTIES | | | | | |
|---|---|---|---|---|---|---|
| EXAMPLE | FS (ksi) RT/178° C. | FM (msi) RT/178° C. | SBS (ksi) | Density (g/cc) | NMP (wt. %) | MR |
| 1 | 90/68 | 5.6/5.4 | 10.4 | 1.525 | 0.06 | 10 |
| 2 | ND | ND | ND | ND | 0.42 | 10 |
| 3 | 100/57 | 6.2/4.9 | 10.6 | 1.498 | 0.19 | 10 |
| 3 | 90/48 | 5.9/5.1 | 10.3 | 1.488 | 0.21 | 9 |
| 4 | 92/46 | 5.8/4.5 | 10.4 | 1.503 | NA | 10 |
| 4 | 81/44 | 6.7/5.2 | 10.0 | 1.499 | 0.20 | 9 |

TABLE 6-continued

| | AS-MOLDED PROPERTIES | | | | | |
|---|---|---|---|---|---|---|
| EXAMPLE | FS (ksi) RT/178° C. | FM (msi) RT/178° C. | SBS (ksi) | Density (g/cc) | NMP (wt. %) | MR |
| 6 | 74/48 | 5.2/4.9 | ND | ND | ND | 1* |
| 12 | 68/ND | 6.2/ND | ND | 1.515 | ND | 5 |
| 14A | 69/ND | 5.9/ND | ND | 1.512 | ND | 6 |
| 14B | 65/ND | 5.9/ND | ND | 1.504 | ND | 7 |
| 15 | 101/59 | 6.7/6.2 | 10.0 | 1.54 | ND | 7 |
| 17 | 148/38 | 7.9/5.0 | 12.0 | 1.600 | 0.02 | 6 |
| 18 | 108/60 | 8.2/6.3 | 11.2 | 1.54 | 0.47 | 10 |
| 19 | 79/51 | 5.9/5.5 | 8.6 | 1.522 | 0.03 | 5 |
| 20 | 86/52 | 6.6/6.0 | 10.3 | 1.521 | 0.03 | 8 |
| 21 | 89/49 | 6.3/5.7 | 9.8 | 1.501 | 0.04 | 9 |
| 22 | 94/53 | 6.4/5.9 | 10.7 | 1.490 | 0.15 | 9 |
| 23 | 93/50 | 5.7/5.2 | 10.7 | 1.480 | 0.29 | 10 |
| 24 | 101/66 | 6.5/6.6 | 11.2 | 1.527 | 0.17 | 10 |
| 25 | 97/62 | 7.2/7.1 | 10.7 | 1.529 | 0.08 | 10 |
| 26 | 89/45 | 7.7/5.9 | 8.2 | 1.525 | 0.01 | 7 |
| 27 | 81/53 | 6.8/7.0 | 8.1 | 1.555 | >0.01 | 8 |

*This value is not representative of a true MR for the composite in view of the low H₂O ABS reported in TABLE 7 (0.91 wt. %), MR of 7 after post-cure as shown in TABLE 8 and the fact that MR at molding pressures of 1,000 psi are well in excess of 1 as a general rule and large increases in MR due to post-curing are a typical.

TABLE 7

| | AS-MOLDED/SATURATED PROPERTIES | | |
|---|---|---|---|
| EXAMPLE | H₂O ABS (wt. %) | FS (ksi) RT/178° C. | FM (msi) RT/178° C. |
| 1 | 0.94 | 98/36 | 6.1/4.4 |
| 3 | 0.94 | 89/14 | 5.3/2.0 |
| 3 | 0.84 | 89/38 | 5.7/4.6 |
| 4 | 0.87 | 77/38 | 4.8/3.9 |
| 4 | 0.84 | 91/39 | 5.9/4.6 |
| 6 | 0.91 | 71/43 | 5.7/5.1 |
| 12 | ND | 73/46* | 6.6/5.0* |
| 14A | ND | 60/47* | 5.4/5.6* |
| 14B | ND | 57/48* | 5.6/4.8* |
| 15 | 0.96 | 98/17 | 6.9/2.2 |
| 17 | 0.60 | 149/10 | 7.4/1.6 |
| 19 | 0.84 | 92/37 | 6.6/5.0 |
| 20 | 0.83 | 87/39 | 6.8/5.3 |
| 21 | 0.89 | 93/38 | 6.6/5.2 |
| 22 | 0.87 | 97/40 | 6.6/5.1 |
| 23 | 0.87 | 95/32 | 6.2/4.0 |
| 24 | 0.80 | 100/38 | 5.8/4.1 |
| 25 | 0.75 | 102/39 | 6.5/4.9 |
| 26 | 0.76 | 82/37 | 7.2/5.2 |
| 27 | 0.69 | 82/45 | 6.6/5.9 |

*Parts tested at 204°]C. instead of 178° C.

The remaining sections of the molded composites other than those from EXAMPLES 12, 14A and B were post-cured by heating in a Blue M, circulating air, convection oven equipped with a programmable temperature controller according to the following schedule:

| Temperature (°C.) | Days Held at Temperature (Days) |
|---|---|
| 204 (400° F.) | 1 |
| 232 (450° F.) | 1 |
| 238 (460° F.) | 1 |
| 243 (470° F.) | 1 |
| 249 (480° F.) | 1 |
| 254 (490° F.) | 1 |
| 260 (500° F.) | 3 |

One of the post-cured sections than was tested without further conditioning or treatment and the other was tested after saturation with water in the manner described above. Properties, determined as described above, are reported in TABLES 8 and 9.

TABLE 8

| | POST-CURED PROPERTIES | | | | |
|---|---|---|---|---|---|
| EXAMPLE | FS (ksi) RT/178° C. | FM (msi) RT/178° C. | SBS (ksi) | Density (g/cc) | MR |
| 1 | 105/70 | 5.9/5.4 | 9.5 | 1.512 | 8 |
| 3 | 109/64 | 5.8/5.2 | 10.6 | 1.490 | 8 |
| 3 | 111/66 | 5.8/5.8 | 9.5 | 1.476 | 7 |
| 4 | 122/97 | 7.3/8.3 | 9.9 | 1.505 | 7 |
| 4 | 99/61 | 5.8/5.8 | 9.3 | 1.503 | 8 |
| 6 | 74/58 | 5.6/5.4 | ND | ND | 7 |
| 15 | 102/64 | 7.1/7.2 | 10.1 | 1.54 | 8 |
| 17 | 159/66 | 7.8/6.5 | 11.9 | 1.589 | 6 |
| 19 | 97/78 | 6.4/6.4 | 11.1 | 1.510 | ND |
| 20 | 108/76 | 7.1/7.0 | 12.5 | 1.524 | ND |
| 21 | 105/77 | 7.0/7.2 | 12.0 | 1.514 | ND |
| 22 | 110/82 | 7.0/6.8 | 13.0 | 1.490 | ND |
| 23 | 106/67 | 6.1/6.1 | 12.1 | 1.523 | ND |
| 24 | 115/83 | 6.0/6.5 | 11.6 | 1.514 | 10 |
| 25 | 110/79 | 6.6/7.4 | 10.4 | 1.534 | 10 |
| 26 | 108/73 | 6.4/6.6 | 9.0 | 1.526 | 5 |
| 27 | 97/55 | 6.9/6.6 | 8.0 | 1.540 | ND |

TABLE 9

| | POST-CURED/SATURATED PROPERTIES | | |
|---|---|---|---|
| EXAMPLE | H₂O ABS (wt. %) | FS (ksi) RT/178° C. | FM (msi) RT/178° C. |
| 1 | 0.93 | 98/46 | 6.0/4.9 |
| 3 | 0.97 | 107/40 | 5.9/4.2 |
| 3 | 1.10 | 104/52 | 6.3/5.9 |
| 4 | 1.05 | 93/38 | 5.4/4.0 |
| 4 | 1.11 | 96/48 | 5.3/5.6 |
| 6 | 0.84 | 71/47 | 5.4/5.1 |
| 15 | 0.93 | 87/59 | 7.2/6.5 |
| 17 | 0.65 | 156/27 | 7.2/2.4 |
| 19 | 1.24 | 86/52 | 6.3/5.5 |
| 20 | 1.10 | 90/53 | 6.5/5.6 |
| 21 | 0.93 | 100/45 | 6.3/5.1 |
| 22 | 0.97 | 107/49 | 6.5/5.4 |
| 23 | 1.01 | 112/45 | 5.8/4.4 |
| 24 | 0.98 | 109/54 | 6.3/5.7 |
| 25 | 1.00 | 107/54 | 6.7/6.0 |
| 26 | 0.93 | 80/56 | 6.4/7.1 |
| 27 | 0.74 | 80/48 | 6.8/6.3 |

Glass transition temperatures of various molded composites were determined by differential scanning calorimetry. Results are reported in TABLE 10.

TABLE 10

| | Tg (°C.) | | | |
|---|---|---|---|---|
| Example | As-Molded | As-Molded/ Saturated | Post-Cured | Post-Cured/ Saturated |
| 1 | 224 | ND | 243 | ND |
| 3 | ND | 184 | 230 | 183 |
| 3 | 225 | 222 | ND | 187 |
| 4 | 229 | 232 | 235 | 182 |
| 4 | ND | ND | ND | 184 |
| 5 | ND | ND | 248 | ND |
| 12 | 265 | ND | ND | ND |
| 15 | 225 | 169 | 238 | 179 |
| 17 | 180+ | 154 | 192 | 176 |
| 27 | 235 | 190 | 239 | 203 |

+Average of two values.

As can be seen from the foregoing examples and tables, the invented polyamide-imides were useful for impregnation of a carbon fiber woven fabric substrate over a wide range of compositions. Similarly, composites prepared from the composite prepregs exhibited generally good mechanical proerties, low water absorbtion and substantial retention of properties after sturation, with the compositions prepared from polyamide-imides having 30 to 50 mole percent PMDA and about 5 to 20 mole percent TMA giving best results. From TABLES 8 and 9 it can be seen further that post curing served to improve properties and, in general, such properties were at least substantially retained after saturation.

Referring more specifically to EXAMPLES 1-14 and properties of composites prepared from the polyamide-imides in those examples, it can be seen from TABLES 6 and 7 that in those examples, it can be seen from TABLES 6 and 7 that both FS and FM at 178° C. of the as-molded and saturated molded composites generally increased with increasing PMDA content. Further improvement in these properties, even after saturation, were achieved by post-curing as seen from TABLE 9.

From the comparative examples (EXAMPLES 15-17) it can be seen that use of 1,3,4-APB in EXAMPLE 16 resulted in a polymer unsuitable for use as a matrix resin for composite structures. Results shown for EXAMPLE 17 show that 1,3,3-APB can be used to prepare polyamide-imide matrix resins for composites and that the composites have good properties when dry (see TABLES 6 and 8). However, comparison of results in TABLES 7 and 9 for the EXAMPLE 17 composite with results for the molded composites of EXAMPLES 4 and 27, having roughly comparable acid component proportions, reveals that the properties of the invented composites were far superior in retention of properties at 178° C. after saturation. As shown in TABLE 10, Tgs of the EXAMPLE 17 material were low.

Comparing the molded composite of comparative EXAMPLE 15, prepared from a polymer free of units based on PMDA, to the invented compositions, it can be seen from TABLE 6 that the invented molded composites generally had higher MR, even at the five mole percent PMDA level used in EXAMPLE 2. While TABLE 6 shows that as-molded properties of the EXAMPLE 15 molded composite were otherwise generally better than the majority of the invented compositions, TABLE 7 shows that the EXAMPLE 15 composite absorbed up to about 0.2 weight percent more water than the invented materials. Properties of the saturated EXAMPLE 15 material at 178° C. fell off dramatically, also as shown in TABLE 7.

We claim:

1. A polyamide-imide composition comprising recurring units corresponding to the formula

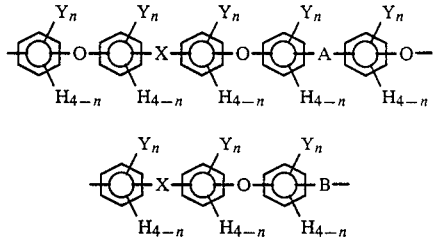

wherein each of the A and B moieties is independently

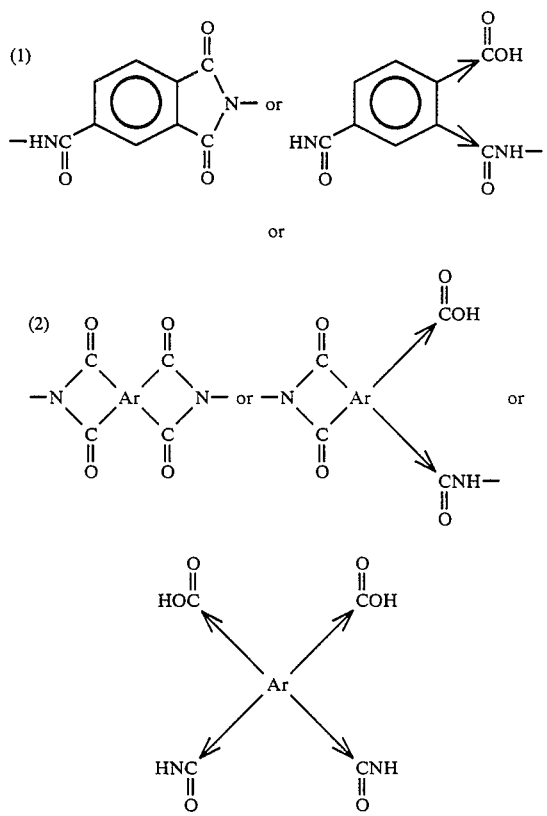

with → denoting isomerism and Ar being a tetravalent aromatic radical having each carboxyl group ortho to one other carboxyl group;
  each Y is independently halogen or $C_{1-6}$ alkyl;
  each n is independently an integer of 0 to 4, inclusive;
  and each X is independently a meta- or para-disposed stable linkage free of sulfone and amide groups, the A and B moieties of said composition providing about 5 to about 95 mole % (1) and about 95 to about 5 mole % (2) based on total moles of (1) and (2).

2. The composition of claim 1 wherein X comprises a covalent carbon-carbon bond, oxy, carbonyl or alkylene or alkylidene of one to about 12 carbon atoms.

3. The composition of claim 1 wherein Ar comprises a single aromatic ring or two or more aromatic rings fused or joined by one or more stable linkages.

4. The composition of claim 3 wherein X comprises an isopropylidene group, n is zero and Ar is 1,2,4,5 phenylene.

5. The composition of claim 1 having an Acid Titre of about 1 to about 3 milliequivalents COOH per gram.

6. The composition of claim 1 further comprising at least one other thermoplastic resin.

7. The composition of claim 1 as a solution in a nitrogen-containing, organic solvent.

8. The composition of claim 1 further comprising at least one particulate or fibrous material or a combination thereof.

9. The composition of claim 8 wherein the fibrous material comprises glass or carbon fibers.

10. A polyamide-imide composition comprising the product of reacting in a nitrogen-containing solvent components comprising trimellitic acid component, aromatic tetracarboxylic acid component in which each carboxyl group is ortho to one other carboxyl group and diamine component corresponding to the formula

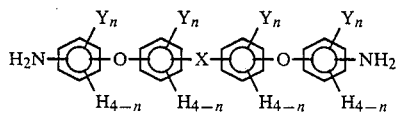

wherein X is a meta-orpara-disposed, stable linkage free of sulfone and amide groups, each Y is independently halogen or alkyl of one to about six carbon atoms and each n is independently an integer of 0 to 4, inclusive; the portions of trimellitic acid component and aromatic tetracarboxylic acid component ranging from about 5 to about 95 mole % and about 95 to about 5 mole % based on total moles of such trimellitic acid and aromatic tetracarboxylic acid components.

11. The composition of claim 10 wherein the trimellitic acid component comprises in combination trimellitic anhydride and 4-trimellitoyl anhydride chloride.

12. The composition of claim 10 wherein the aromatic tetracarboxylic acid component comprises pyromellitic acid dianhydride or biphenyltetracarboxylic acid dianhydride.

13. The composition of claim 10 wherein the diamine component comprises 2,2-bis(4(p-aminophenoxy)phenyl) propane.

14. The composition of claim 10 further comprising at least one other thermoplastic resin.

15. The composition of claim 10 as a solution in a nitrogen-containing organic solvent.

16. The composition of claim 10 further comprising at least one particulate or fibrous material or combination thereof.

17. The composition of claim 16 wherein the fibrous material comprises glass or carbon fibers.

18. A polyamide-imide composition comprising recurring units corresponding to the formula:

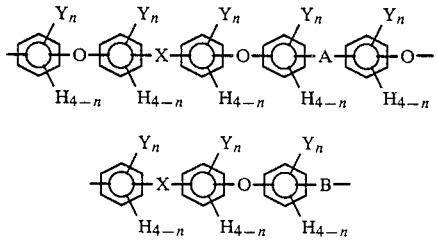

wherein each of the A and B moieties is independently

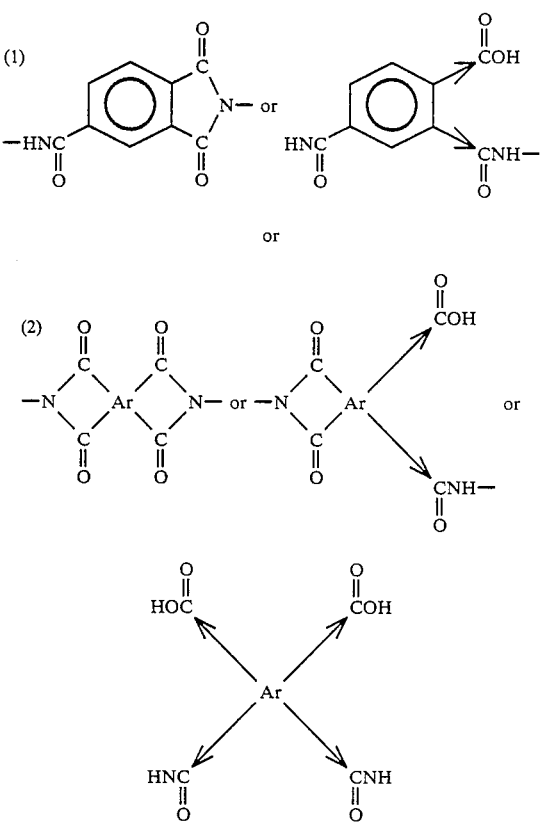

with → denoting isomerism and Ar being a tetravalent aromatic radical having each carboxyl group ortho to one other carboxyl group.

each Y is independently halogen or $C_{1-6}$ alkyl;
each n is independently an integer of 0 to 4 inclusive;
and each X is independently an alkylene or alkylidene group of one to about twelve carbon atoms, the A and B moieties of said composition providing about 5 to about 95 mole % (I) and about 95 to about 5 mole % (2) based on total moles of (1) and (2).

19. The composition of claim 18 wherein Ar comprises a single aromatic ring or two or more aromatic rings fused or joined by one or more stable linkages.

20. The composition of claim 19 wherein X comprises an isopropylidene group and n is zero.

21. The composition of claim 20 wherein Ar comprises 1,2,4,5-phenylene.

22. The composition of claim 20 wherein Ar comprises

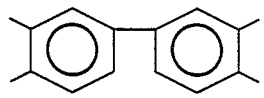

23. The composition of claim 18 having an Acid Titre of about 1 to about 3 milliequivalents COOH per gram.

24. The composition of claim 18 further comprising at least one other thermoplastic resin.

25. The composition of claim 18 as a solution in a nitrogen-containing, organic solvent.

26. The composition of clam 18 further comprising at least one particulate of fibrous material or a combination thereof.

27. The composition of claim 24 wherein the fibrous material comprises glass or carbon fibers.

28. A polyamide-imide composition comprising the product of reacting in a nitrogen-containing solvent components comprising trimellitic acid component, aromatic tetracarboxylic acid component is which each carboxyl group is ortho to one other carboxyl gorup and diamine component corresponding to the formula

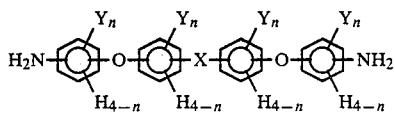

wherein each X is independently an alkylene or alkylidene group of one to about twelve carbon atoms, each Y is independently halogen or alkyl of one to about six carbon atoms and each n is independently an integer of 0 to 4, inclusive; the portions of trimellitic acid component and aromatic tetracarboxylic acid component ranging from about 5 to about 95 mole % and about 95 to about 5 mole % based on total moles of such trimellitic acid and aromatic tetracarboxylic acid components.

29. The composition of claim 28 wherein the trimellitic acid component comprises in combination trimellitic anhydride and 4-trimellitoyl anhydride chloride.

30. The composition of claim 28 wherein the aromatic tetracarboxylic acid component comprises pyromellitic acid dianydride or biphenyltetracarboxylic acid dianhydride 31. The composition of claim 28 wherein the diamine component comprises 2,2-bis(4(p-aminophenoxy)phenyl) propane.

32. The composition of claim 28 further comprising at least one other thermoplastic resin.

33. The composition of claim 28 as a solution in a nitrogen-containing organic solvent.

34. The composition of claim 28 further comprising at least one particulate or fibrous material or combination thereof.

35. The composition of claim 34 wherein the fibrous material comprises glass or carbon fibers.

* * * * *